US012720304B2

(12) United States Patent
Ben Henda et al.

(10) Patent No.: US 12,720,304 B2
(45) Date of Patent: Aug. 25, 2026

(54) PROVIDING PRIVACY FOR NON-PUBLIC NETWORKS

(71) Applicant: TELEFONAKTIEBOLAGET LM ERICSSON (PUBL), Stockholm (SE)

(72) Inventors: Noamen Ben Henda, Vällingby (SE); Joachim Sachs, Sollentuna (SE); Kun Wang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 736 days.

(21) Appl. No.: 17/607,763

(22) PCT Filed: Apr. 17, 2020

(86) PCT No.: PCT/EP2020/060847
§ 371 (c)(1),
(2) Date: Oct. 29, 2021

(87) PCT Pub. No.: WO2020/221604
PCT Pub. Date: Nov. 5, 2020

(65) Prior Publication Data

US 2022/0210635 A1 Jun. 30, 2022

Related U.S. Application Data

(60) Provisional application No. 62/839,861, filed on Apr. 29, 2019.

(51) Int. Cl.
*H04W 12/037* (2021.01)
*H04L 9/08* (2006.01)

(52) U.S. Cl.
CPC ......... *H04W 12/037* (2021.01); *H04L 9/0819* (2013.01)

(58) Field of Classification Search
CPC .................................................. H04W 12/037
See application file for complete search history.

(56) References Cited

U.S. PATENT DOCUMENTS

2004/0259529 A1* 12/2004 Suzuki .................... H04M 3/16 455/410
2006/0251257 A1* 11/2006 Haverinen .......... H04L 63/0869 726/2

(Continued)

FOREIGN PATENT DOCUMENTS

CN 109286460 A1 1/2019

OTHER PUBLICATIONS

Office Action mailed Jan. 11, 2024 for Chinese Patent Application No. 202080045986.8, 22 pages (includes English translation).

(Continued)

*Primary Examiner* — Simon P Kanaan
(74) *Attorney, Agent, or Firm* — Sage Patent Group

(57) ABSTRACT

In one aspect there is provided a method for providing privacy, where the method is performed by a network node (e.g., gNB) and includes: obtaining a first security parameter (e.g., an encryption key) for use in concealing information (e.g., TSI originating from a TSN) associated with a first network (e.g., a first NPN); receiving information transmitted by a node (e.g., a node within the TSN); concealing the information using the obtained security parameter (e.g., encrypting the TSI using the encryption key), thereby generating concealed information; including the concealed information in a SIB; and broadcasting the SIB over the air.

5 Claims, 18 Drawing Sheets

(56) References Cited

U.S. PATENT DOCUMENTS

| | | | | | |
|---|---|---|---|---|---|
| 2006/0285519 | A1* | 12/2006 | Narayanan | H04W 12/0431 | 370/469 |
| 2007/0082654 | A1* | 4/2007 | Hovnanian | H04L 63/105 | 455/410 |
| 2013/0013923 | A1* | 1/2013 | Thomas | H04W 12/06 | 713/168 |
| 2018/0007557 | A1* | 1/2018 | Lee | H04L 67/12 | |
| 2019/0223063 | A1* | 7/2019 | Palanigounder | H04W 60/005 | |
| 2019/0364492 | A1* | 11/2019 | Azizi | H04W 48/16 | |
| 2020/0259896 | A1* | 8/2020 | Sachs | H04W 12/04 | |
| 2020/0296187 | A1* | 9/2020 | Sabella | H04L 67/12 | |
| 2022/0210635 | A1* | 6/2022 | Ben Henda | H04W 12/03 | |
| 2023/0092723 | A1* | 3/2023 | Qu | H04W 56/001 | 370/235 |

OTHER PUBLICATIONS

3GPP, TR 23.734 V16.1.0 , "3rd Generation Partnership Project; Technical Specification Group Services and System Aspects; Study on enhancement of 5G System (5GS) for vertical and Local Area Network (LAN) services (Release 16)", 3GPP TR 23.734 V16.1.0, Mar. 2019.

Lévesque et al, "A survey of clock synchronization over packet-switched networks", IEEE communications surveys & tutorials, vol. 18, No. 4, Jul. 12, 2016.

Mizrahi et al., "Security Requirements of Time Protocols in Packet Switched Networks", Internet Engineering Task Force (IETF), Request for comments: 7384, Oct. 17, 2014.

* cited by examiner

M: Port is in Master state
S: Port is in Slave state
GM: Grand Master

PROVIDING PRIVACY FOR NON-PUBLIC NETWORKS

RELATED APPLICATIONS

This application is a national stage application of International Patent Application No. PCT/EP2020/060847, filed Apr. 17, 2020, which claims the benefit of provisional patent application Ser. No. 62/839,861, filed Apr. 29, 2019, the disclosure of are hereby incorporated herein by reference in their entirety.

TECHNICAL FIELD

Disclosed are embodiments related to providing privacy for non-public communication networks.

BACKGROUND

The 3rd Generation Partnership Project (3GPP) security standardization working group, known as SA3, has been studying security aspects for the fifth-generation (5G) enhancements to support verticals and 5G Location Area Network (LAN) services. The study is being documented in 3GPP Technical Report (TR) 33.819. The study is a continuation of the architectural study conducted by the architecture standardization working group, known as SA2, and captured in 3GPP TR 23.734 v16.1.0 ("TR 23.734"). The new features are intended to help verticals make use of the 5G System services by either deploying their own standalone 5G System, a concept denoted "standalone Non-Public Network (NPN)" or via a Public Land Mobile Network (PLMN), called "integrated NPN." An example is a factory owner who intends to deploy a private 5G System to provide connectivity to the machines and the employees in the factory.

Background on the 5G System

The 5G System comprises an access network (AN) (e.g., a radio access network (RAN)) and a core network (CN). The AN is the network that allows a user equipment (UE) (i.e., any communication device capable of communicating with an access network node (e.g., base station) in the AN) to gain connectivity to CN (e.g. the base station which could be a gNB or an ng-eNB in 5G). The CN contains Network Functions (NFs) ensuring a wide range of different functionalities such as session management, connection management, charging, authentication, etc. FIG. 1, which is taken from 3GPP Technical Specification (TS) 23.501 v16.0.0 ("TS 23.501"), illustrates a high-level overview of the 5G non-roaming reference architecture.

The communication links between the UE and the network (the AN and a CN node) can be grouped in two different strata. The UE communicates with CN nodes (e.g., AMF) over the Non-Access Stratum (NAS), and with the AN over the Access Stratum (AS). All the NAS communication takes place between the UE and the Access and Mobility Management Function (AMF) in the CN over the NAS protocol (N1 interface in FIG. 1). More details on the 5G security mechanisms can be found in 3GPP TS 33.501 v15.40 ("TS 33.501").

The SA2, in its study on the support of NPN, has considered how to introduce the support for Time Sensitive Networks (TSNs) as described in clause 5.3 of TR 23.734. The final solution which was agreed by SA2 for this feature is described in clause 6.8 of TR 23.734 and requires that the 5G System appear as a TSN bridge in the sense of how it is defined by the IEEE and the IETF. FIG. 2, from the selected solution in clause 6.8, illustrates the functional enhancements expected on the 5G System to act as a TSN bridge.

SUMMARY

For a TSN, additional enhancements are required so that the 5G system can convey time synchronization information (TSI) between the TSN System and the UE. Several possible options for this are described in clause 6.11 and 6.28 of TR 23.734. In one of the options for conveying TSI to the UE, a RAN node, e.g. a gNB, includes the TSI in the System Information (SI) (e.g., an SI block (SIB)) that the 5G RAN node broadcasts regularly, which SI is available to all UEs in the range of the RAN node. This is further described in clause 6.11 and 6.28 of TR 23.734.

In deployment scenarios where the 5G connectivity services are provided by a network operator to a factory owner deploying a TSN, such timing information would be visible to any device (e.g., a factory robot) in the range of the RAN node broadcasting such information, including devices not owned or operated by the factory owner (e.g., a competitor of the factory owner or other third-party could position a UE within the coverage of the RAN node and use the UE to obtain sensitive information transmitted by the RAN node and intended only for devices within the factory owner's factory). This might also be the case where the network operator provides the same service to multiple factory owners and the network operator's RAN is shared across their respective factory sites.

Broadcasting in clear information pertaining to an NPN (e.g. TSI) is a potential threat. In particular, this TSI could reveal detailed information on how the factory operates, for example, how many time domains there are, clock precision, etc. Such detailed information could be used by a malicious eavesdropper in order to mount targeted attacks or the information could be used by a competitor to improve its own manufacturing process. Therefore, it is important to prevent such TSI being obtained by unauthorized devices.

Accordingly, this disclosure proposes to convey over the air such sensitive NPN information (e.g., TSI) in a concealed manner (e.g. encrypted), and discloses various ways in which this can be accomplished, thereby enhancing privacy of the NPN and the overall system. Advantages of various embodiments include: i) concealment of sensitive information when it is transmitted over the air to a UE, thereby hiding the information from unauthorized UEs (e.g., UEs not authorized to access the NPN whose TSI is being signaled) and, thus, increasing privacy and reducing malicious attackers and other unauthorized third-parties from obtaining the confidential information; ii) embodiments do not require new messages; ii) embodiments do not incur signaling overhead; and iv) embodiments rely on existing procedures.

In one particular aspect there is provided a method for providing privacy, where the method is performed by a network node (e.g., gNB). In one embodiment, the method includes obtaining a first security parameter (e.g., an encryption key) for use in concealing time synchronization information (TSI). The method also includes receiving TSI transmitted by a node (e.g., a node within a TSN). The method also includes concealing the TSI using the obtained security parameter (e.g., encrypting the TSI using the encryption key), thereby generating concealed TSI. The method also includes including the concealed TSI in a system information block (SIB). And the method also includes broadcasting the SIB over the air.

In another embodiment, the method includes the network node performing the steps of: receiving TSI; determining a set of one or more UEs that are entitled to receive the TSI; and, for each UE included in the determined set of UEs, unicasting to the UE an encrypted version of the TSI.

In another aspect there is provided a network node apparatus that is adapted to perform the any of the methods described above.

In another aspect there is provided a method for providing privacy, where the method is performed by a UE. In one embodiment, the method includes the UE transmitting a request message to a core network node. The method also includes the UE receiving a response message transmitted by the core network node as a response to the request message, wherein the response message comprises a first de-concealing parameter for use in de-concealing concealed TSI. The method also includes the UE receiving first broadcast system information comprising the concealed TSI. The method further includes the UE de-concealing the concealed TSI using the first de-concealing parameter.

In another embodiment, the method includes the UE receiving encrypted TSI; using a security key to decrypt the TSI; and providing the decrypted TSI to a node of a TSN. In some embodiments, receiving the encrypted TSI comprises receiving a cipher protected Radio Resource Control, RRC, message comprising encrypted TSI.

In another aspect there is provided a UE that is adapted to perform either one of the two above described UE methods.

In another aspect there is provided a method for providing privacy, where the method is performed by a core network (CN) node. In one embodiment the method includes the CN node receiving a request message transmitted by a UE. The method further includes the CN node transmitting a response message as a response to the request message, wherein the response message comprises a de-concealing parameter for use by the UE in de-concealing concealed TSI included in a SIB broadcast by a network node.

In another aspect there is provided a computer program comprising instructions which when executed by processing circuitry causes the processing circuitry to perform the method of any one of the above embodiments. In another aspect there is provided a carrier containing the computer program, wherein the carrier is one of an electronic signal, an optical signal, a radio signal, and a computer readable storage medium.

Additional aspects and embodiments are described herein.

BRIEF DESCRIPTION OF THE DRAWINGS

The accompanying drawings, which are incorporated herein and form part of the specification, illustrate various embodiments.

DETAILED DESCRIPTION

As described in TR 23.734, in some applications there is a requirement for synchronization of all automation endpoints, in order for the endpoints to coordinate sensing and actuation procedures at a common sampling point, with alignment of the order of 1 microsecond. (See, e.g., bullet 4, Clause 5.3.2.3 of TR 22.804 for a description of the use case).

With TSN, synchronization is performed by IEEE 802.1AS/gPTP messages where each automation endpoint acts as an 802.1AS client, and a TSN Master Clock that generates the 802.1AS messages. For automation systems operating over a wireless interface, there are at least two types of solutions for the delivery of precise timing information to the UE, denoted Type-A and Type-B.

Type A—A 5G system is modelled as a time-aware system to support the TSN time synchronization. This type of solution refers to TR23.734 clause 6.11 option 3 and clause 6.28. In this solution, only the network elements at the edges of the 5G system (i.e. UPF side or UE side translator/adaptor) need to support the IEEE 802.1AS operations, the whole 5G system appears as an 802.1AS compliant entity (time aware system) that allows TSN nodes to use 802.1AS standardized signaling to exchange time information.

Figure 3:
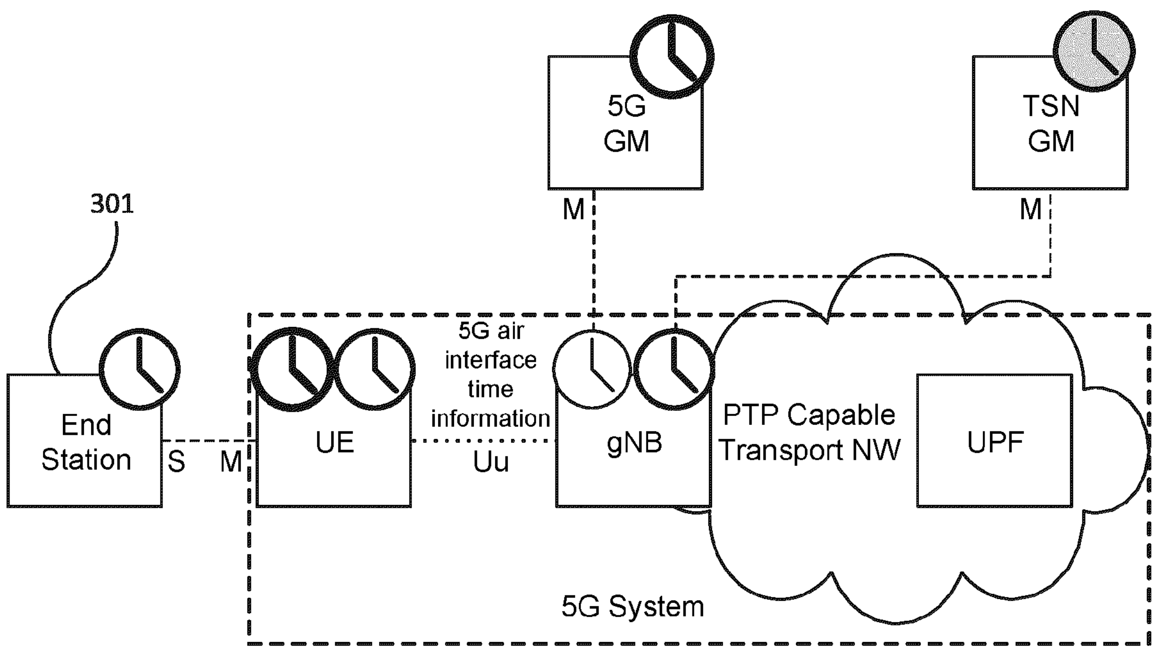
FIG. 3 shows one option for the delivery of precise timing information to a UE.

Type B—5G RAN conveying timing to the UE that acts as boundary master clocks towards connected TSN device via 5G specific signaling via 5G broadcast or 5G unicast Radio Resource Control (RRC) (see FIG. 3, which illustrates option 2, this type of solution refers to TR23.734 clause 6.11 option 2). The 5G RAN indicates time associated with a specific point (e.g. start of frame boundary) of 5G RAN's fine-frame structure. In case of multiple clock domains, 5G RAN using broadcast signaling can convey timing information associated with all clock domains to UE or 5G RAN using unicast signaling can convey timing information associated with a subset of clock domains. The 5G RAN can receive the TSN timing information via direct connectivity with TSN master clocks, e.g. via underlying transport network by having an embedded TSN client within the gNB (this option does not use UE specific 802.1AS messages). Other means for 5G RAN to receive TSN timing information is not precluded and it is up to network deployment.

Figure 4:
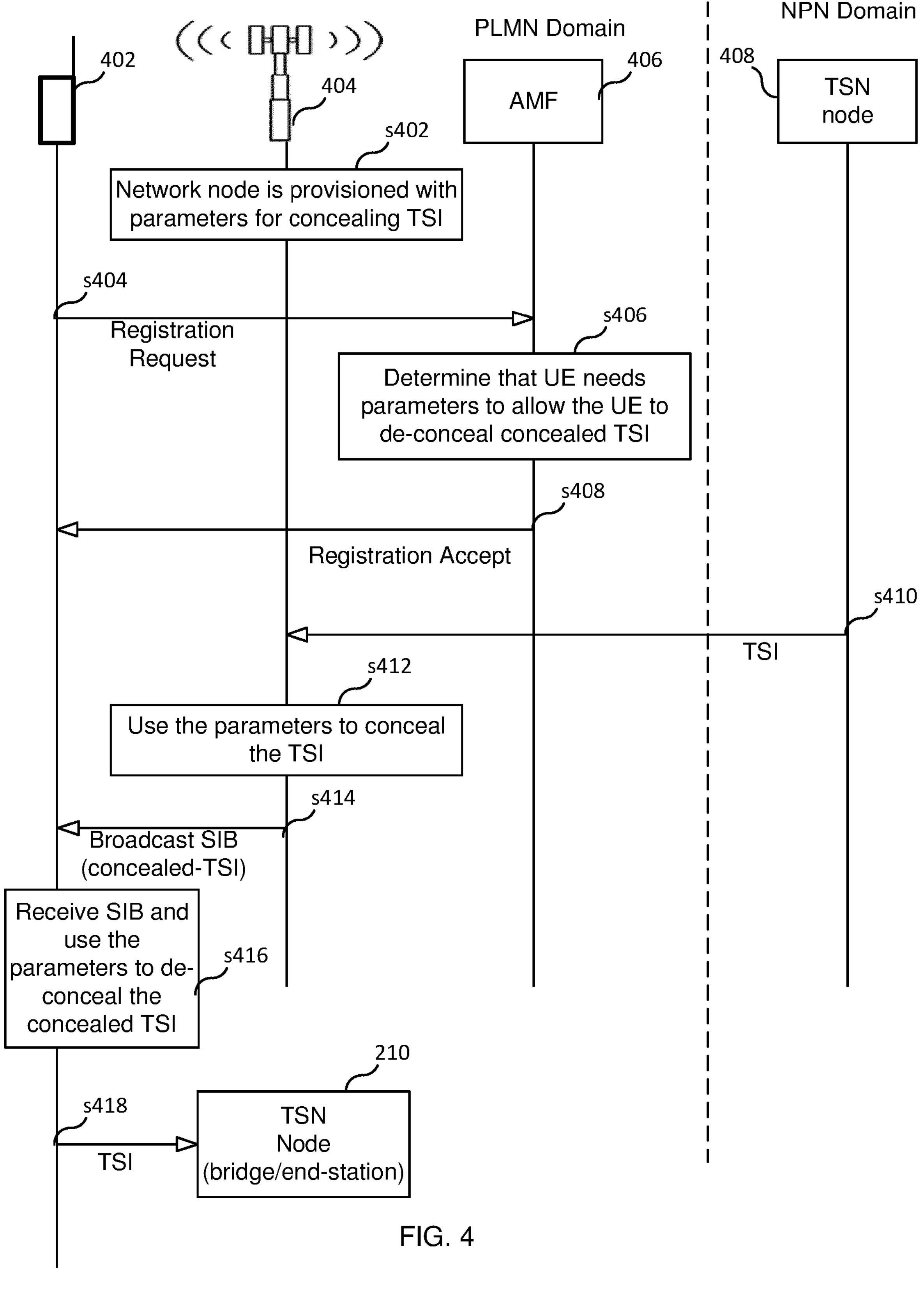
FIG. 4 is a message flow diagram illustrating a process according to an embodiment.

As noted above, transmitting (e.g., broadcasting or unicasting) in the clear information pertaining to an NPN (e.g. TSI) is a potential threat. Accordingly, in order to provide a greater degree of privacy and to protect networks (e.g., NPNs) from malicious actors, this disclosure proposes to convey sensitive network information (e.g., TSI) in a concealed manner (e.g. encrypted). An embodiment is illustrated in FIG. 4, which illustrates TSI being concealed using security parameters that are provided to the UE. More specifically, FIG. 4 shows how this can be realized during a 5G Registration Procedure, which is described in 3GPP TS 23.502 v15.4.1 ("TS 23.502").

In step s402, a network node 404 (e.g., a gNB of a 5G AN) obtains security parameters for the concealment (e.g., encryption) of TSI transmitted by different TSNs. For example, if network node 404 serves multiple different NPNs, then, for each such NPN, network node obtains a security parameter for concealing the TSI transmitted by a TSN in the domain of that NPN. In the example shown, network node 404 is serving NPN-1. Thus, in step s402, network node 404 may obtain security parameters uniquely associated with NPN-1 (e.g., uniquely associated with the NPN ID that identifies NPN-1) and then uses these security parameters to conceal TSI transmitted by TSN 408, which is in the domain of NPN-1.

In step s404, a UE 402 initiates a registration procedure by sending a Registration Request to an AMF 406. The registration procedure may be an Initial Registration, in which case a Primary Authentication procedure is triggered to establish security before moving forward with the Registration Procedure. In the remaining steps, it is assumed that the UE has been successfully authenticated and established NAS security so all subsequent NAS messages in the procedure are ciphered and integrity protected.

In step s406, the AMF 406 determines whether the UE is entitled to receive TSI transmitted by TSN 408. This could be based on subscription information, the obtained subscription identifier (SUPI) (the SUPI is obtained by the core network during the registration procedure) or based on local operator configuration or even received from another Network Function (NF), e.g. SMF, PCF or UDM in one of the not shown steps of the overall Registration Procedure described in detail in TS 23.502. As are result of determining that the UE is entitled to receive TSI transmitted by TSN 408, the AMF obtains de-concealment parameters associated with TSN 408 (e.g., de-concealment parameters associated with NPN-1), which de-concealment parameters will enable the UE to de-conceal concealed TSI that originates from TSN 408. These parameters could be pre-provisioned in advance to the AMF or retrieved from another NF or even derived in the AMF. If the UE is not entitled to receive TSI transmitted by TSN 408, but AMF determines that the UE is entitled to receive TSI from a TSN in different NPN (e.g., NPN-2), then AMF would obtain de-concealment parameters associated with the other NPN (e.g., NPN-2). As noted above, the AMF can determine which NPN, if any, a UE is associated with based on, for example, subscription information for the UE. For instance, the subscription information for a UE may include an NPN ID identifying the NPN with which the UE is associated. The AMF would then use the NPN ID to obtain a de-concealment parameter associated with the identified NPN.

In step s408, the AMF includes the obtained de-concealment parameter(s) in a Registration Accept message that the AMF then transmits to the UE (this Registration Accept message is responsive to the Registration Request message transmitted by the UE).

In step s410, the network node 404 receives TSI transmitted by TSN node 408. The occurrence of this step s410 in the order shown in FIG. 4 is not necessary as this step could be performed at any time and is not dependent on UE-specific procedures.

In step s412, the network node uses a security parameter (e.g., an encryption key) received in step s402 (or a security parameter derived from a master key) to conceal the received TSI. In embodiments where the network node serves more than one NPN, the network node first retrieves the appropriate security parameters. For example, the network node first determines the NPN from which the TSI originated and then retrieves the security parameter for that NPN. Once the appropriate security parameter(s) are obtained, the network node uses these security parameter(s) to conceal the TSI.

In step s414, the network node broadcasts the concealed TSI. For example, the concealed TSI is included in a System Information Block (SIB) broadcast by the network node. In some embodiments, in addition to including the concealed TSI, the SIB includes information indicating one or more NPNs which are supported by the network node (e.g., a combination of NPN ID and PLMN ID is included in the SIB to indicate a particular NPN).

Figure 1:
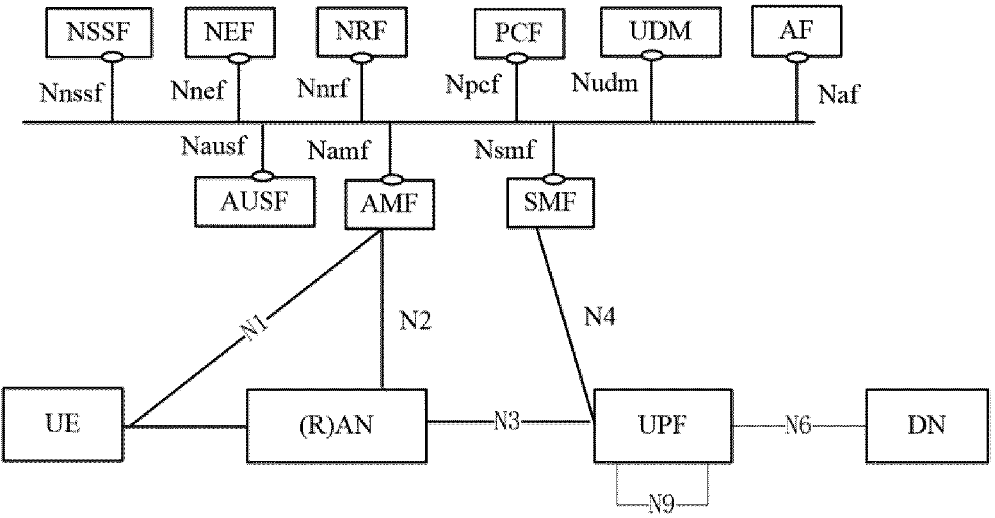
FIG. 1 shows a high level architectural view of a 5G network.
Figure 2:
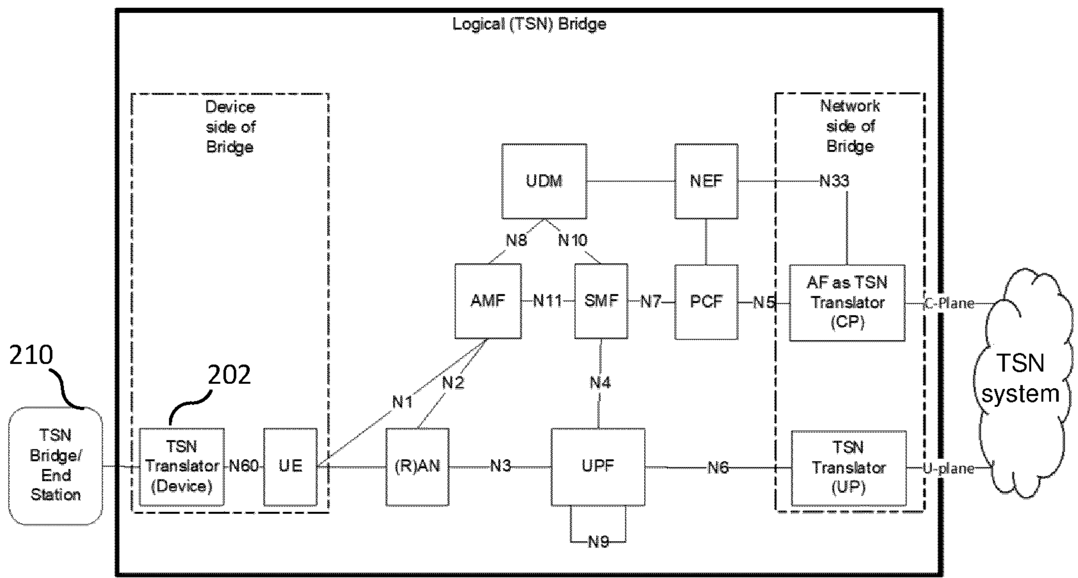
FIG. 2 illustrates a 5G System functioning as a TSN bridge.

In step s416, the receives the broadcast SIB containing the concealed TSI and the UE uses the obtained de-concealing parameters to de-conceal the TSI. In some embodiments, the UE acts as a boundary master clock and the UE provides the de-concealed TSI to a TSN node 210 (e.g., a TSN bridge or TSN end station 301). In some embodiments, the UE provides the TSI to node 210 via a TSN translator 202, as shown in FIG. 2.

In one embodiment, the security parameters pre-provisioned to the network node 404 include an encryption key (and optionally a key identifier). Accordingly, the de-concealment parameters provided to the UE could include a decryption key (and optionally a key identifier). In case a symmetric encryption scheme is used, the encryption and decryption keys would be the same.

The provisioning of the security parameters to the network node and/or the provisioning of the de-concealment parameters to the AMF could be performed by the operator using conventional management interfaces. For the symmetric encryption scheme case, it could be enough to provision the RAN and AMF nodes with a master key (Km) that is later used to derive NPN-specific keys for the protection of their respective TSIs. This derivation could be performed by a one-way-function like the key derivation function (KDF) used in the 3GPP specification taking in as input Km (the master key) and an NPN-specific known parameter (e.g., NPN id) and optionally a freshness parameter. This would provide cryptographic separation and guarantees that only authorized UEs can successfully de-conceal the TSI, e.g. in deployment scenarios where the RAN is shared among different NPNs. Thus, in some embodiments, in response to receiving the Registration Request message transmitted in step s404, the AMF, among other things, determines the NPN with which the UE is associated, if any, and includes in the Registration Response message the decryption key associated with the determined NPN so that the UE may decrypt TSI originating from a TSN node that is within the domain of the determined NPN.

Coming back to the security parameter definition, a key identifier may facilitate management and revocation of keys. If included alongside the concealed TSI (but in clear) then this would give an indication to the UE which key is used and if the UE does not recognize the key then it will trigger a Registration procedure to retrieve the key material. In another embodiment, the de-concealment parameters are provisioned to the UE using the UE Configuration Update procedure described in TS 23.502.

Figure 5:
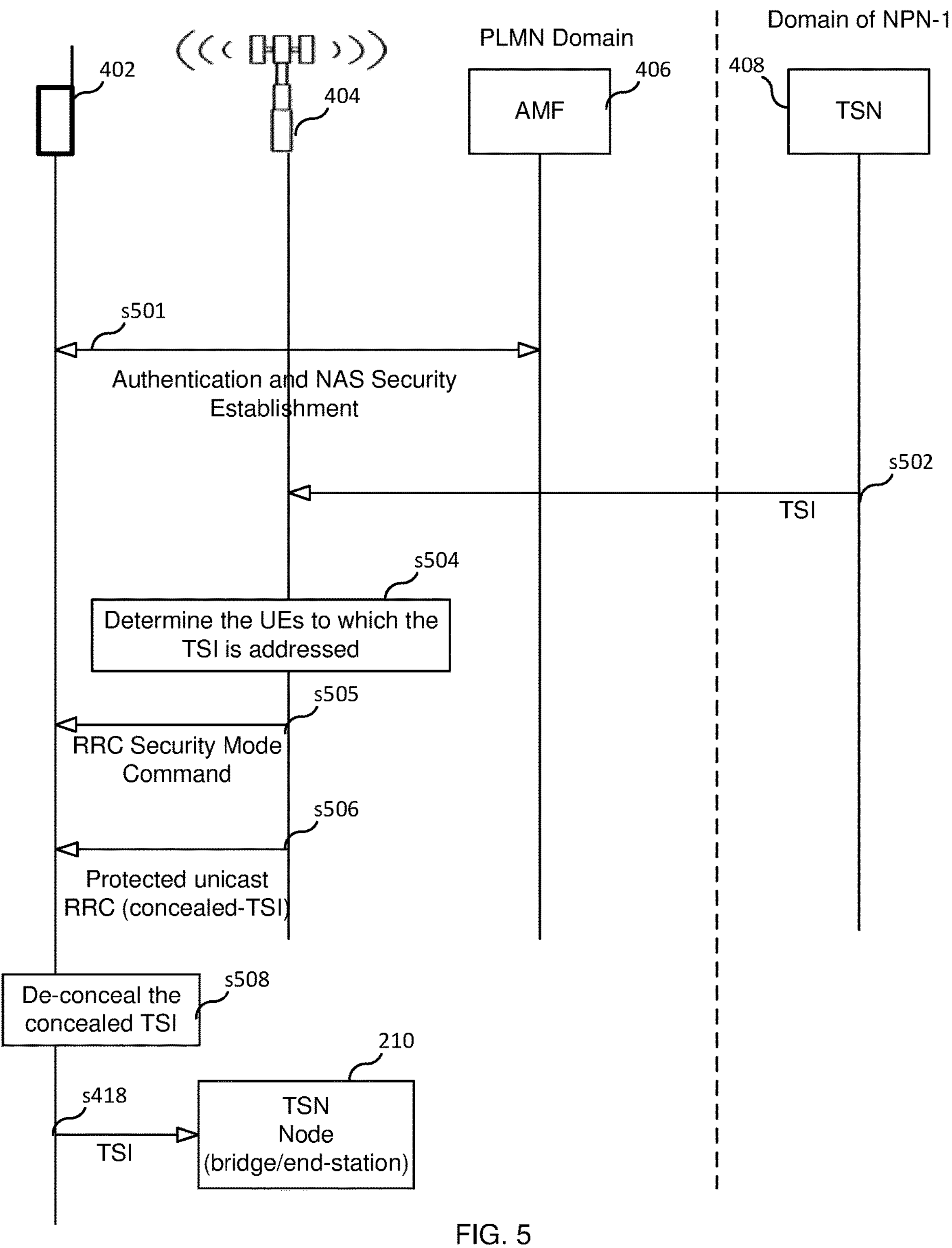
FIG. 5 is a message flow diagram illustrating a process according to an embodiment.

In another embodiment, the TSI is signaled from the network node to the UE using unicast RRC signaling after the network node commands the UE to activate AS security (e.g., after the network node transmits to the UE an RRC Security Mode Command, which causes the UE to generate the appropriate encryption keys to allow the UE to decrypt encrypted RRC messages transmitted by the network node to the UE), as illustrated in FIG. 5. In this manner the TSI is concealed as part of the overall RRC protection mechanism provided by the PDCP protocol and offering both ciphering and integrity protection. In such a case, the network does not need to provision any additional security parameters and only relies on existing keys that are established during the AS security setup as described in TS 33.501.

As shown in FIG. 5, in a first step (steps s501), the UE has been UE has successfully authenticated by the AMF and the AMF and UE have established NAS security. For example, step s501 may comprise the AMF sending to the UE a NAS Security Code Command containing security parameters (e.g., a key selection identifier and/or information indicating a protection algorithm) enabling the UE to generate a NAS key.

In step s502, the network node 404 receives TSI transmitted by TSN node 408 (e.g., the network node receives a gPTP message containing the TSI). The occurrence of this step s502 in the order shown in FIG. 5 is not necessary as this step could be performed at any time and is not dependent on UE-specific procedures.

In some embodiments, after receiving the TSI, the network node determines a set of one or more UEs to which the TSI is addressed (step s504). For instance, the TSI may be included in a multicast message containing a multicast destination address and the network node uses a look-up table (or other data structure) to determine the set UEs that are members of the multicast group identified by the multicast destination address.

In this example, UE 402 is included in the determined set of UEs and the network node has not yet established security with the UE. Accordingly, the network node does so by running the AS Security Mode Command procedure as described in TS 33.501 (e.g., the network node transmits to the UE an RRC Security Mode Command) (see step s505). This results in the activation of the ciphering and integrity protection for the RRC signaling between the UE and the network node.

In step s506, the network node includes the TSI received in step s502 in a downlink RRC message transmitted (unicast) to the UE. Since ciphering is activated, the TSI is then concealed over the air interface from malicious eavesdropper. RAN sharing is not problematic here, since the TSI is provided separately to each UE in signaling message that are protected by UE-specific security keys.

Figure 6:
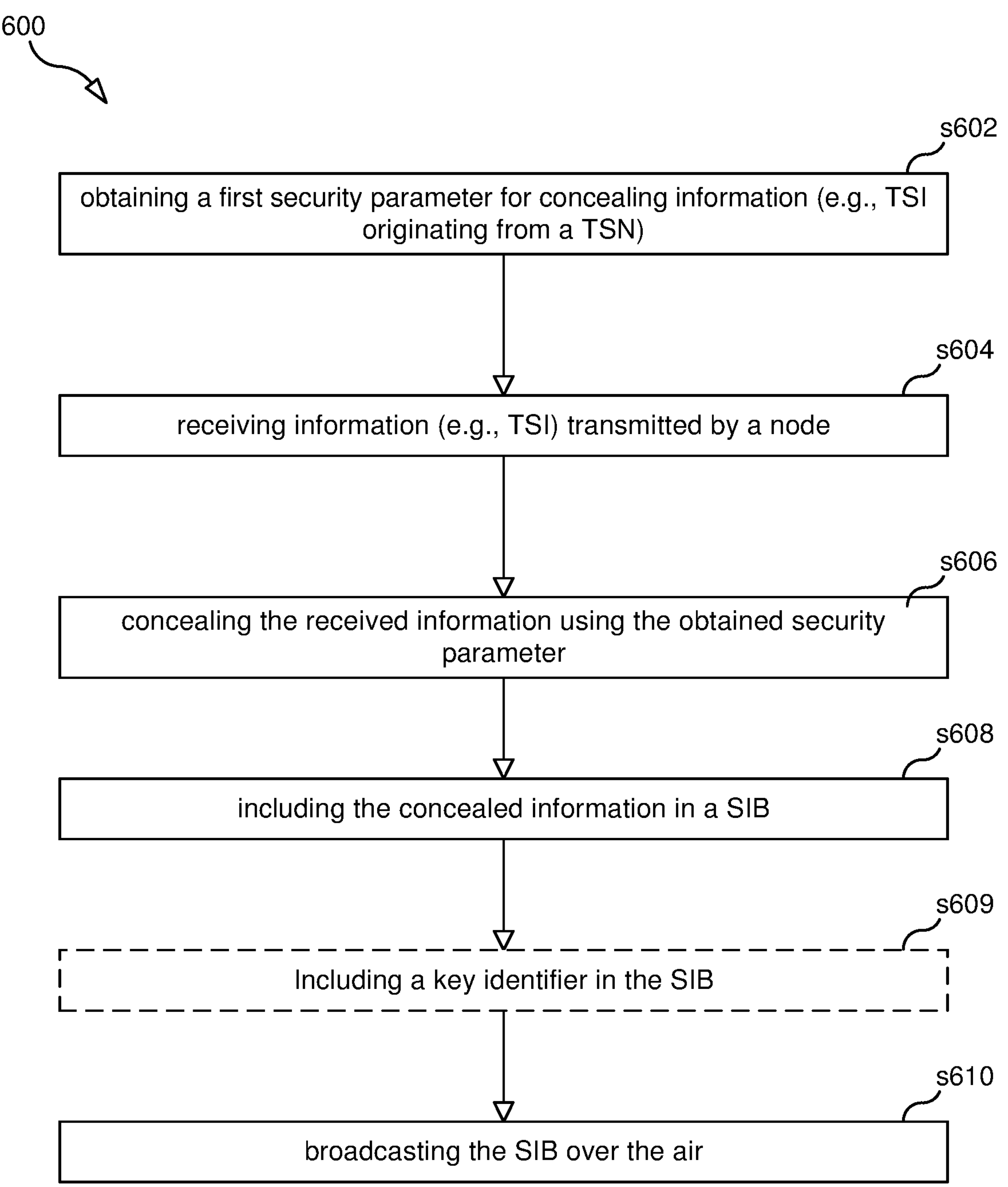
FIGS. 6-10 are flowcharts illustrating processes according to various embodiments.

FIG. 6 is a flowchart illustrating a process 600, according to an embodiment, for providing privacy for a network (e.g., an NPN). Process 600 may begin with step s602.

Step s602 comprises a network node (e.g., gNB 404) obtaining a first security parameter for concealing information (e.g., TSI originating from a TSN (e.g., a TSN associated with a first NPN)). In some embodiments, the first security parameter is an encryption key. In some embodiments, process 600 further includes the network node obtaining a master key, and the network node obtains the encryption key by using the master key and a key derivation function to generate the encryption key. In some embodiments, the network node obtains an NPN identifier that identifies the first NPN, and the network node uses the master key and the NPN identifier as inputs to the key derivation function, which is configured to produce the encrypted key based on the inputs to the KDF, thereby producing an encryption key specific to the NPN identified by the NPN identifier.

Step s604 comprises the network node receiving information (e.g., TSI) transmitted by a node (e.g., a node within the TSN). Step s606 comprises the network node concealing the received information using the obtained security parameter (e.g., encrypting the TSI using an obtained encryption key), thereby generating concealed information. Step s608 comprises the network node including the concealed information in a system information block, SIB. In some embodiments, process 600 further includes the network node obtaining a key identifier that identifies an encryption key that is used to conceal the information, and the network node includes the key identifier in the SIB (step s609). Step s610 comprises the network node broadcasting the SIB over the air.

Figure 7:
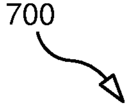
Figure 7:
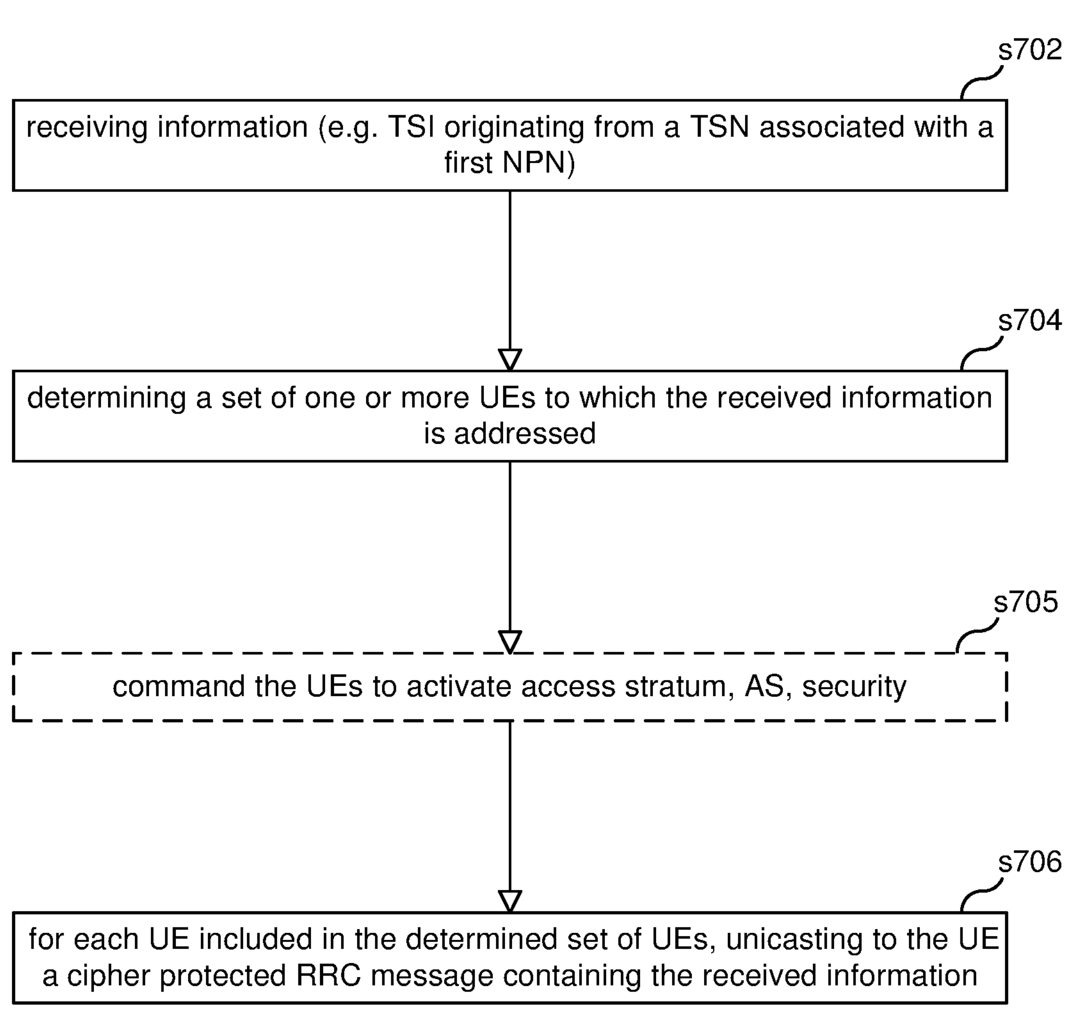

FIG. 7 is a flowchart illustrating a process 700, according to an embodiment, for providing privacy for a network (e.g., an NPN). Process 700 may begin with step s702. Step s702 comprises the network node receiving information (e.g. TSI originating from a TSN associated with a first NPN). Step s704 comprises the network node determining a set of one or more UEs to which the received information is addressed. Step s706 comprises the network node, for each UE included in the determined set of UEs, unicasting to the UE a cipher protected RRC message containing the received information. In some embodiments, the set of UEs comprises a first UE and the process 700 further comprises, prior to transmitting to the first UE the cipher protected RRC message containing the received information, the network node commands the first UE to activate access stratum, AS, security (step s705). In some embodiments the network node commands the first UE to activate the AS security as a direct result of receiving the TSI.

Figure 8:
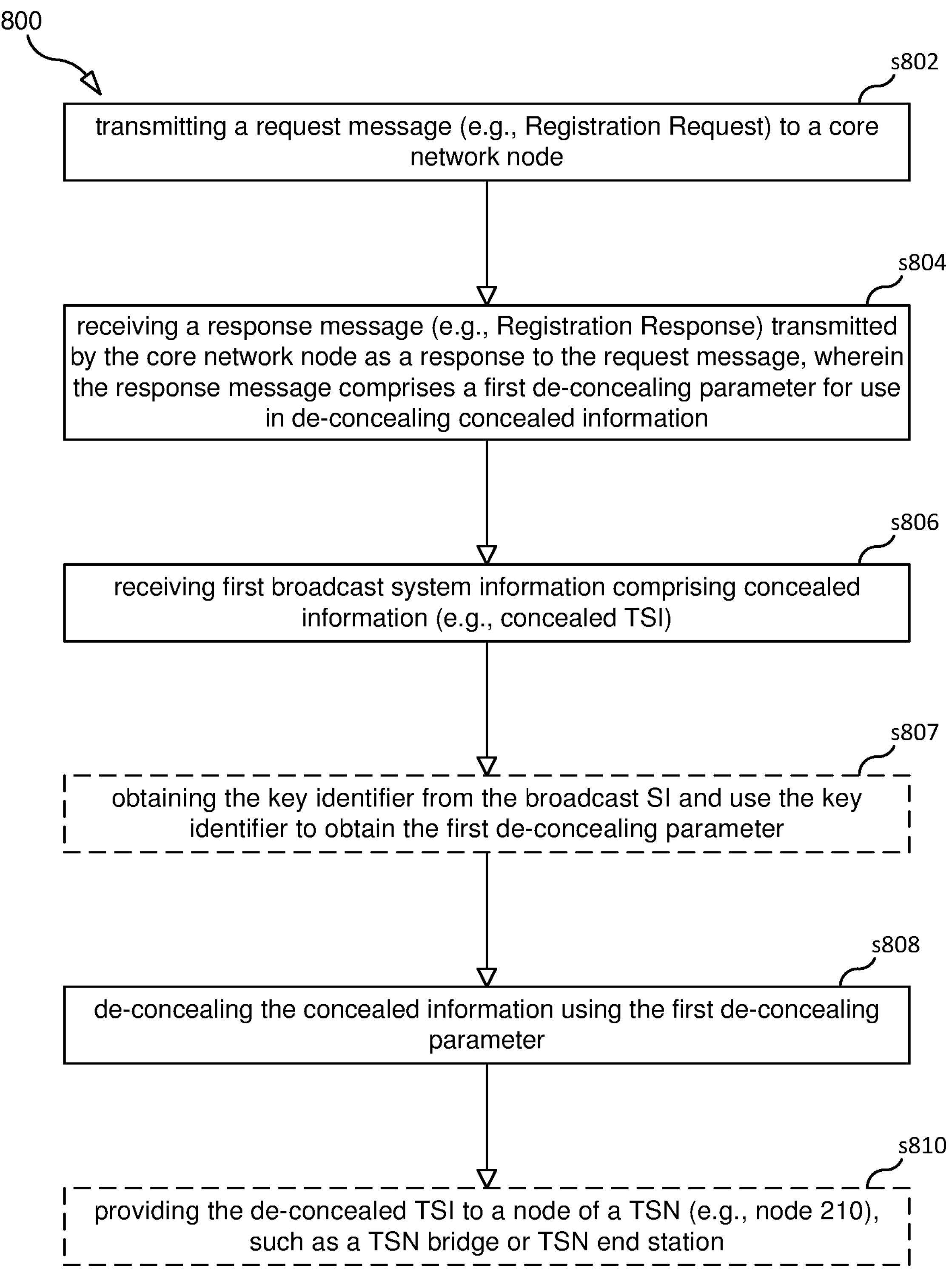

FIG. 8 is a flowchart illustrating a process 800, according to an embodiment, for providing privacy. Process 800 may begin with step s802. Step s802 comprises the UE transmitting a request message (e.g. a 3GPP 5G Registration Request) to a core network node (e.g., AMF). Step s804 comprises the UE receiving a response message (e.g., Registration Response) transmitted by the core network node as a response to the request message, wherein the response message comprises a first de-concealing parameter for use in de-concealing concealed information. Step s806 comprises the UE receiving first broadcast system information comprising concealed information (e.g., concealed TSI). Step s808 comprises the UE de-concealing the concealed information using the first de-concealing parameter.

In some embodiments, the first de-concealing parameter is an encryption key, and the SIB further comprises a key identifier that identifies the encryption key. In some embodiments, process 800 further comprises the UE obtaining the key identifier from the SIB and the UE using the key identifier to obtain the encryption key (e.g., retrieve the encryption key from a data store (e.g., memory)), wherein de-concealing the concealed TSI using the first de-concealing parameter comprises the UE, after retrieving the encryption key using the key identifier, using the retrieved encryption key to de-conceal the concealed TSI.

In some embodiments, process 800 further comprises the UE receiving a system information block, SIB, broadcast by a network node; the UE obtaining from the received SIB a key identifier that identifies an encryption key that was used to encrypt information included in the SIB; the UE determining that the UE does not possess the key identified by the key identifier; and as a result of determining that the UE does not possess the key identified by the key identifier, the UE transmits to a core network node (406) a registration request message.

In some embodiments, process 800 further comprises the UE providing the de-concealed TSI to a node of a TSN (e.g., node 210), such as a TSN bridge or TSN end station (step s810). In some embodiments, the UE provides the TSI to node 210 via a TSN translator 202, as shown in FIG. 2.

Figure 9:
Figure 9:
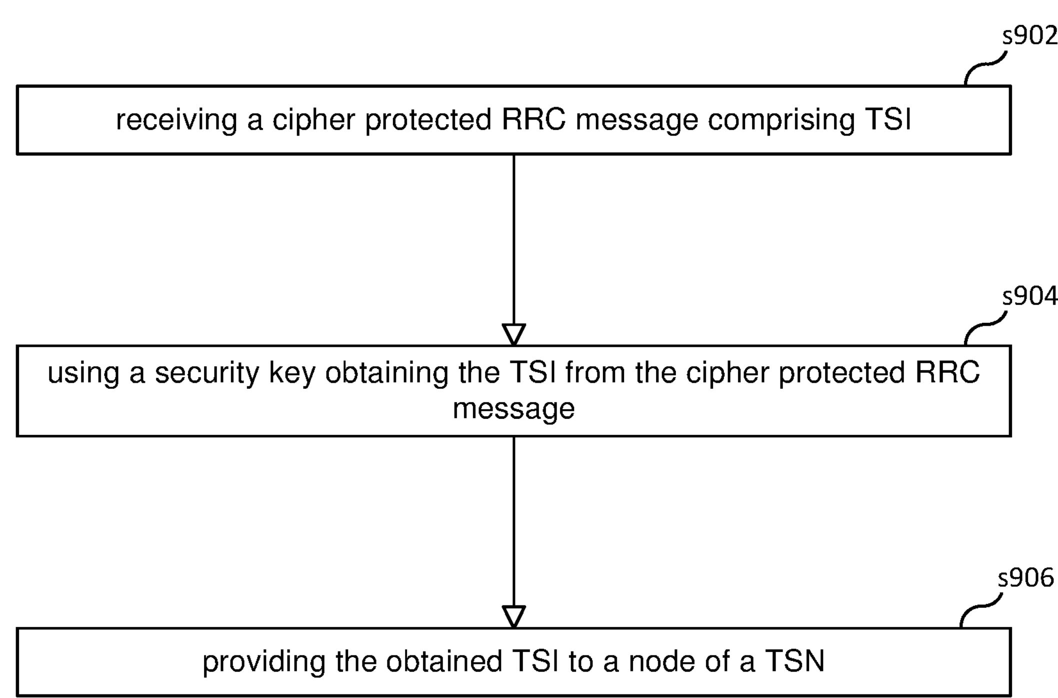

FIG. 9 is a flowchart illustrating a process 900, according to an embodiment, for providing privacy. Process 900 may begin with step s902. Step s902 comprises the UE receiving a cipher protected RRC message comprising TSI. Step s904 comprises the UE using a security key obtaining the TSI from the cipher protected RRC message. Step s906 comprises the UE providing the obtained TSI to a node of a TSN (e.g., node 210).

Figure 10:
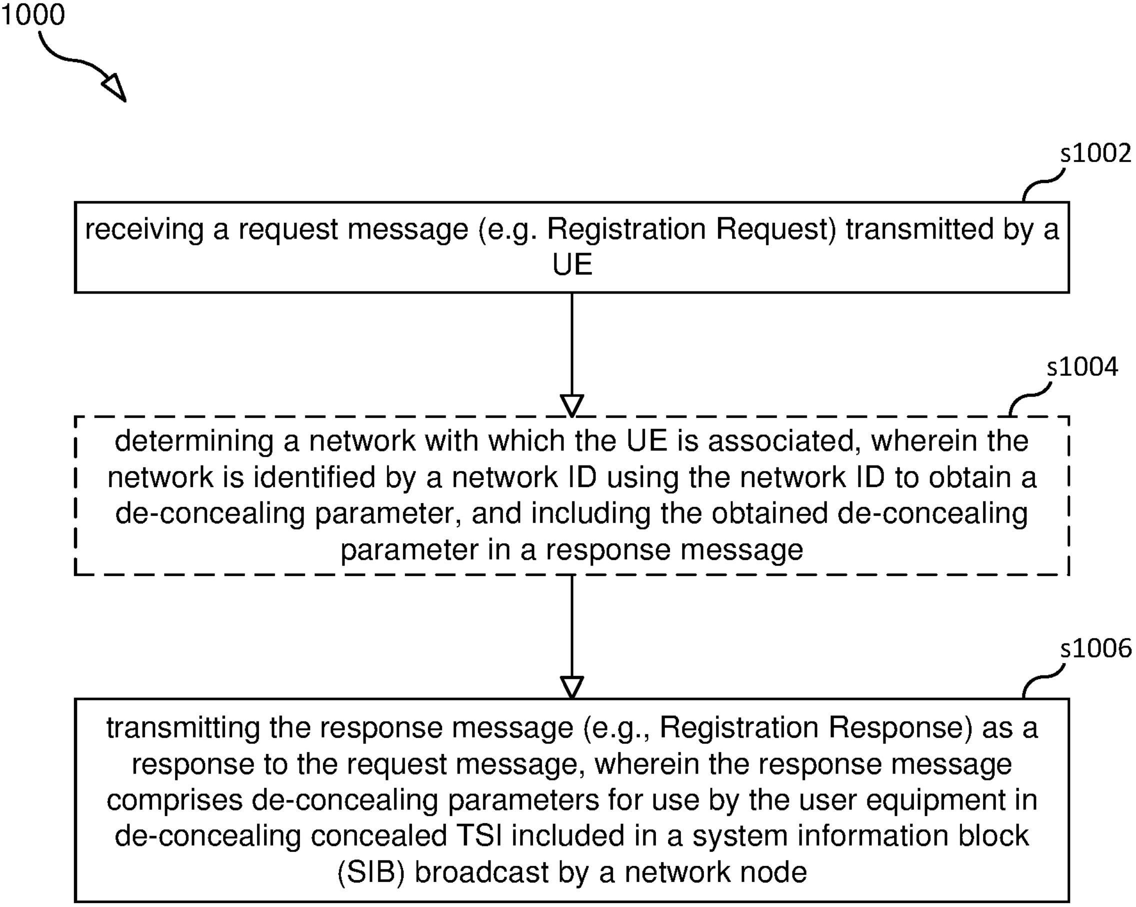

FIG. 10 is a flowchart illustrating a process 1000, according to an embodiment, for providing privacy. Process 1000 may begin with step s1002. Step s1002 comprises a core network node (e.g. node 406) receiving a request message (e.g. Registration Request) transmitted by a UE (e.g., UE 402). Step s1006 comprises the core network node transmitting a response message (e.g., Registration Response) as a response to the request message, wherein the response message comprises at least one de-concealing parameter for use by the user equipment in de-concealing concealed time synchronization information, TSI, included in a system information block (SIB) broadcast by a network node.

In some embodiments, process 1000 further comprises the core network node generating the response message prior to transmitting the response message, wherein generating the response message comprises: the core network node determining a network with which the UE is associated, wherein the network is identified by a network identifier, ID; using the network ID to obtain the de-concealing parameter; and including the obtained de-concealing parameter in the response message (step s1004). In some embodiments, the step of determining a network with which the UE is associated comprises the core network node obtaining subscription information associated with an identifier (e.g., IMSI, SUPI, SUCI, etc.) included in the request message and obtaining the network ID from the subscription information.

Figure 11:
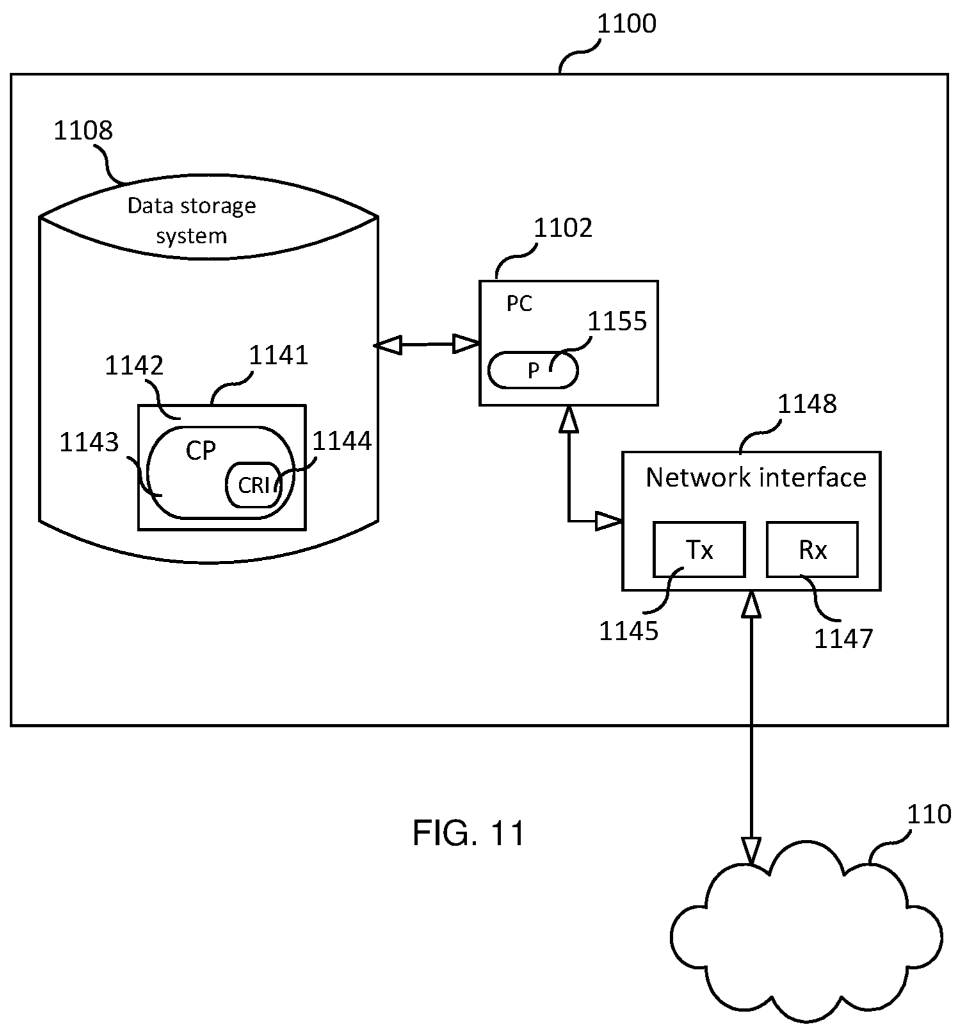
FIG. 11 is a block diagram illustrating a core network node apparatus, according to an embodiment.

FIG. 11 is a block diagram of a core network node apparatus 1100, according to some embodiments, for implementing a core network node, such as AMF 406. As shown in FIG. 11, apparatus 1100 may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1100 may be a distributed computing apparatus); a network interface 1148 comprising a transmitter (Tx) 1145 and a receiver (Rx) 1147 for enabling apparatus 1100 to transmit data to and receive data from other nodes connected to a network 110 (e.g., an Internet Protocol (IP) network) to which network interface 1148 is connected; and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes apparatus 1100 to perform steps described herein (e.g., steps described herein with reference to the flow charts). In other embodiments, apparatus 1100 may be configured to perform steps described herein without the need for code. That is, for example, PC 1102 may consist merely of one or more ASICs. Hence, the features of the embodiments described herein may be implemented in hardware and/or software.

Figure 12:
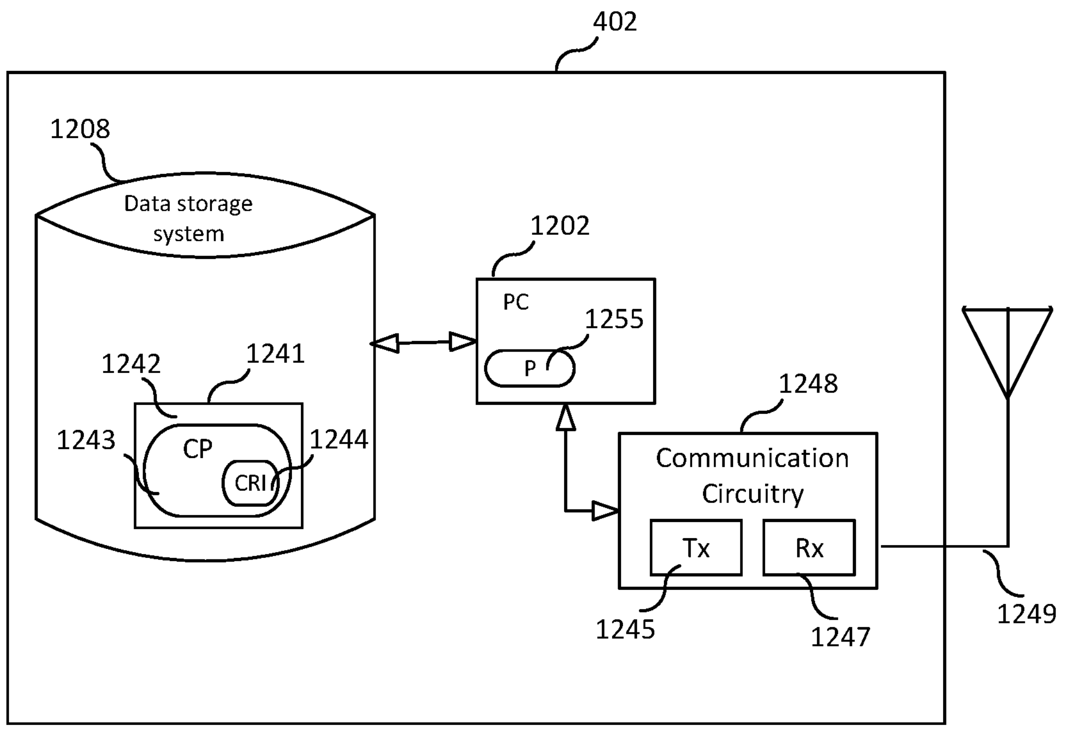
FIG. 12 is a block diagram illustrating UE according to an embodiment.

FIG. 12 is a block diagram of UE 402, according to some embodiments. As shown in FIG. 12, UE 402 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like); communication circuitry 1248, which is coupled to an antenna arrangement 1249 comprising one or more antennas and which comprises a transmitter (Tx) 1245 and a receiver (Rx) 1247 for enabling UE 402 to transmit data and receive data (e.g., wirelessly transmit/receive data); and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes UE 402 to perform steps described herein (e.g., steps described herein with reference to the flow charts). In other embodiments, UE 402 may be configured to perform steps described herein without the need for code. That is, for example, PC 1202 may consist merely of one or more ASICs. Hence, the features of the embodiments described herein may be implemented in hardware and/or software.

Figure 13:
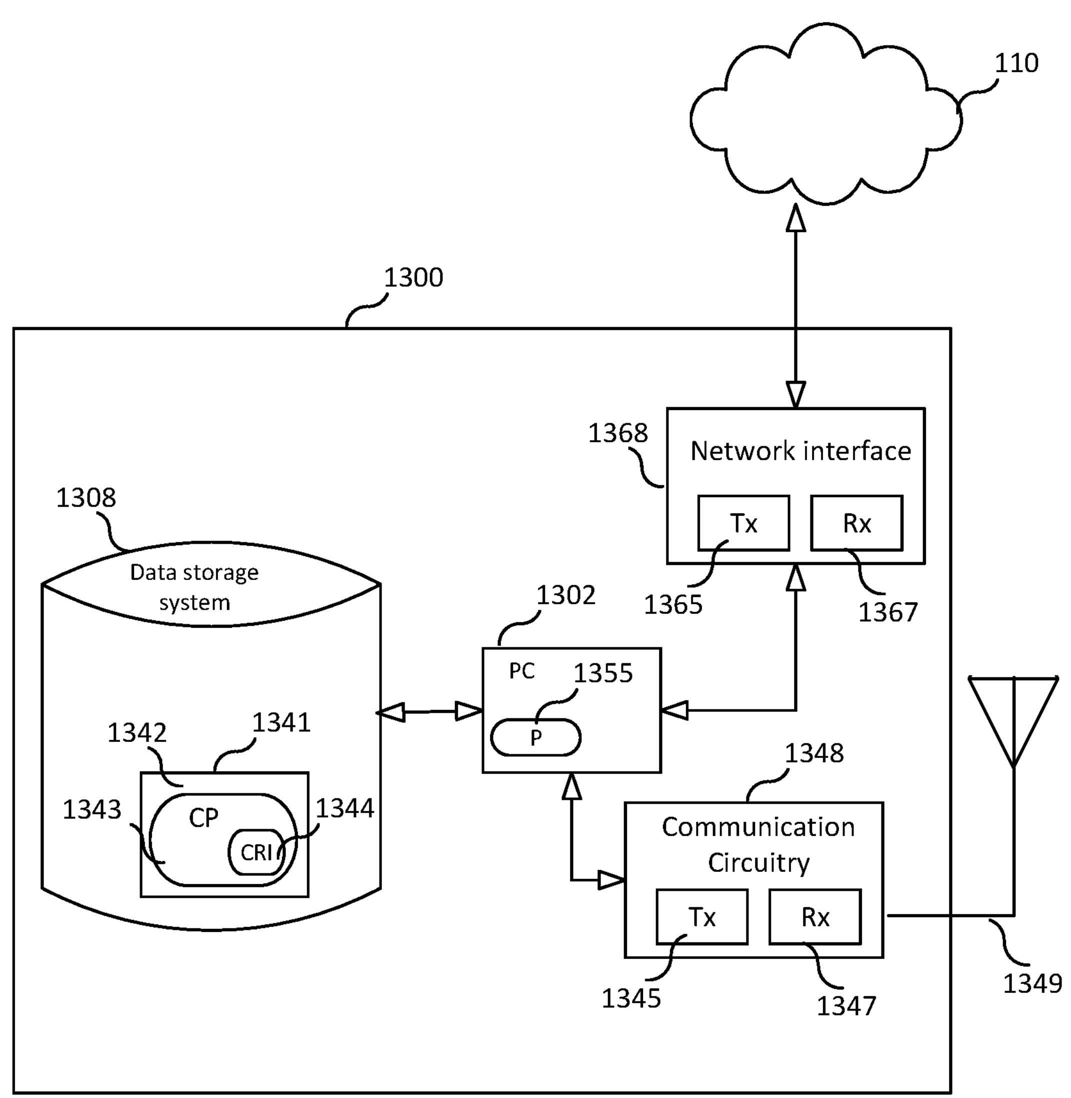
FIG. 13 is a block diagram illustrating an access network node apparatus, according to an embodiment.
Figure 14:
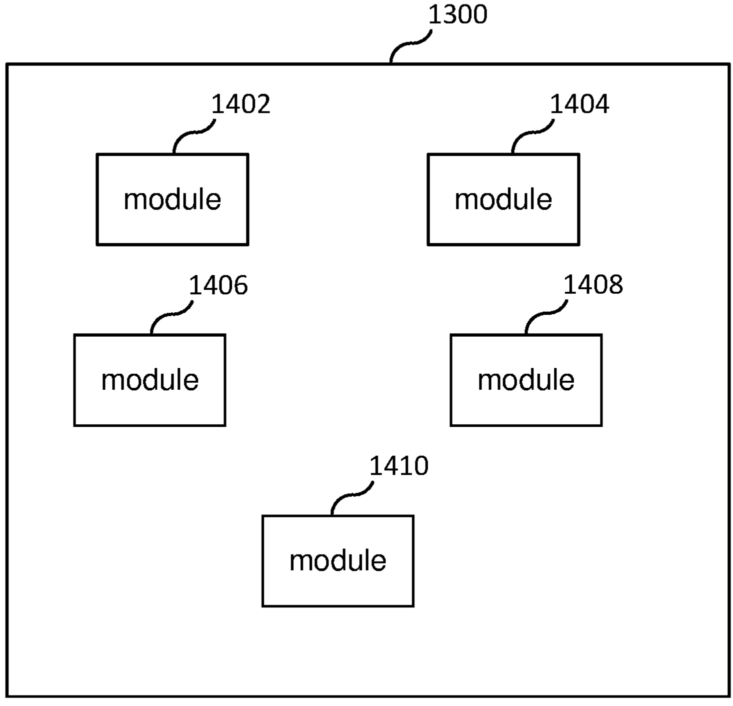
FIG. 14 illustrates modules of an access network node according to an embodiment.
Figure 15:
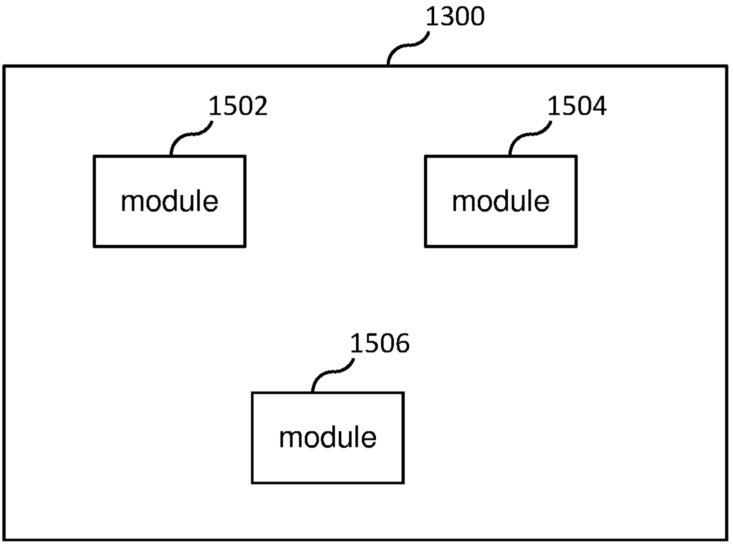
FIG. 15 illustrates modules of an access network node according to an embodiment.
Figure 16:
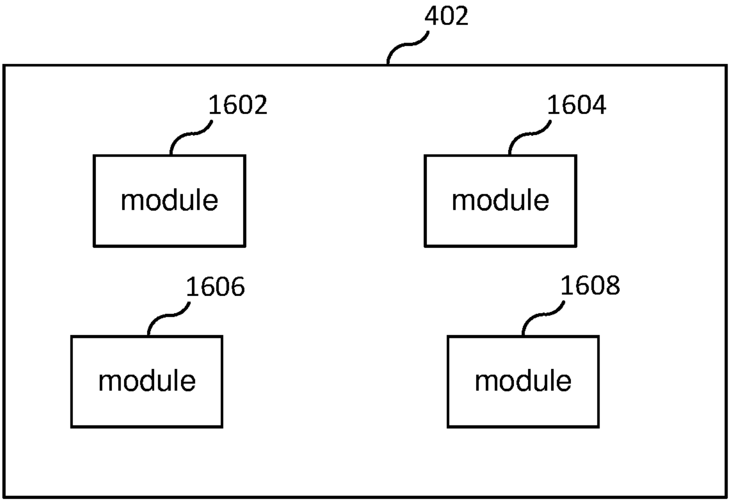
FIG. 16 illustrates modules of a UE according to an embodiment.
Figure 17:
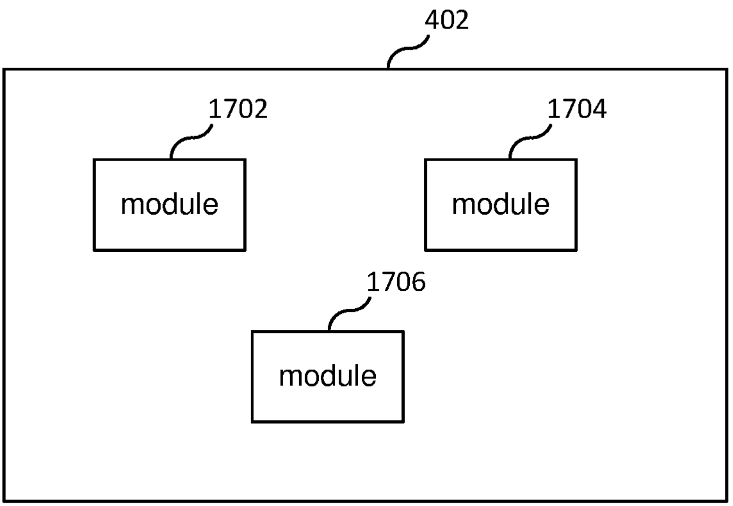
FIG. 17 illustrates modules of a UE according to an embodiment.
Figure 18:
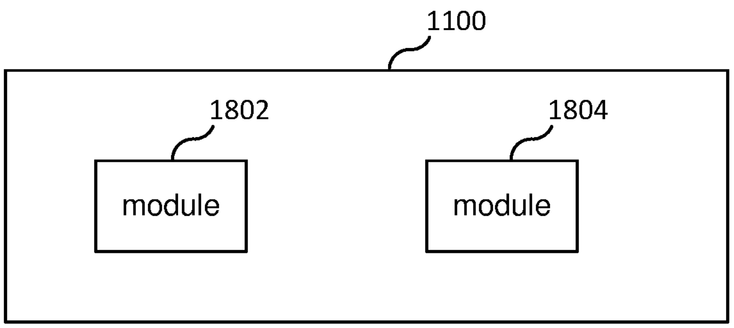
FIG. 18 illustrates modules of a core network node according to an embodiment.

FIG. 13 is a block diagram of a network node apparatus 1300 for implementing a network node (e.g. access network node 404), according to some embodiments. As shown in FIG. 13, the apparatus 1300 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 1300 may be a distributed computing apparatus); a network interface 1368 comprising a transmitter (Tx) 1365 and a receiver (Rx) 1367 for enabling apparatus 1300 to transmit data to and receive data from other nodes connected to a network 110 to which network interface 1348 is connected; communication circuitry 1348, which is coupled to an antenna arrangement 1349 comprising one or more antennas and which comprises a transmitter (Tx) 1345 and a receiver (Rx) 1347 for enabling apparatus 1300 to transmit data and receive data (e.g., wirelessly transmit/receive data);

and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes apparatus 1300 to perform steps described herein (e.g., steps described herein with reference to the flow charts). In other embodiments, apparatus 1300 may be configured to perform steps described herein without the need for code. That is, for example, PC 1302 may consist merely of one or more ASICs. Hence, the features of the embodiments described herein may be implemented in hardware and/or software.

SUMMARY OF VARIOUS EMBODIMENTS

A1. A method (600) for providing privacy, the method being performed by a network node (404) and comprising: obtaining a first security parameter (e.g., an encryption key) for use in concealing time synchronization information, TSI, originating from a time sensitive network, TSN, associated with a first network (e.g., a first NPN); receiving TSI transmitted by a node (e.g., a node within the TSN); concealing the TSI using the obtained security parameter (e.g., encrypting the TSI using the encryption key), thereby generating concealed TSI; including the concealed TSI in a system information block, SIB; and broadcasting the SIB over the air.

A2. The method of embodiment A1, wherein the first security parameter is an encryption key.

A3. The method of embodiment A1 or A2, further comprising: the network node obtaining a key identifier that identifies the encryption key, the network node includes the key identifier in the SIB that it broadcasts over the air.

A4. The method of any one of embodiments A2-A3, further comprising the network node obtaining a master key, wherein the step of obtaining the first security parameter comprises the network node using the master key and a key derivation function to generate the encryption key.

A5. The method of embodiment A4, further comprising the network node obtaining an NPN identifier that identifies the first NPN, wherein using the master key and a key derivation function, KDF, to generate the encryption key comprises using the master key and the NPN identifier as inputs to the key derivation function, which is configured to produce the encrypted key based on the inputs to the KDF.

B1. A method for providing privacy, the method being performed by a network node (404) and comprising: receiving time synchronization information, TSI, originating from a time sensitive network, TSN, associated with a first NPN; determining a set of one or more user equipments, UEs, to which the TSI is addressed; for each UE included in the determined set of UEs, unicasting to the UE a cipher protected Radio Resource Control, RRC, message containing the TSI.

B2. The method of embodiment B1, wherein the set of UEs comprises a first UE and the method further comprises, prior to transmitting to the first UE the cipher protected RRC message containing the TSI, the network node commands the first UE to activate access stratum, AS, security.

B3. The method of embodiment B2, wherein the network node commands the first UE to activate the AS security as a direct result of receiving the TSI.

C1. A method for providing privacy, the method being performed by a user equipment, UE (402) and comprising: transmitting a request message (e.g. Registration Request) to a core network node (e.g., AMF); receiving a response message (e.g., Registration Response) transmitted by the core network node as a response to the request message, wherein the response message comprises a first de-concealing parameter for use in de-concealing concealed time synchronization information, TSI; receiving first broadcast system information comprising the concealed TSI; and de-concealing the concealed TSI using the first de-concealing parameter.

C2. The method of embodiment C1, wherein the first de-concealing parameter is an encryption key, and the SIB further comprises a key identifier that identifies the encryption key.

C3. The method of embodiment C2, further comprising the UE obtaining the key identifier from the SIB and the UE using the key identifier to retrieve the encryption key, wherein de-concealing the concealed TSI using the first de-concealing parameter comprises the UE, after retrieving the encryption key using the key identifier, using the retrieved encryption key to de-conceal the concealed TSI.

C4. The method of any one of embodiments C1-C3, further comprising: the UE receiving a system information block, SIB, broadcast by a network node; the UE obtaining from the received SIB a key identifier that identifies an encryption key that was used to encrypt information included in the SIB; the UE determining that the UE does not possess the key identified by the key identifier; and as a result of determining that the UE does not possess the key identified by the key identifier, the UE transmits to a core network node (406) a registration request message.

C5. The method of any one of embodiments C1-C4, further comprising the UE providing the de-concealed TSI to a node (210) of a time sensitive network, TSN.

D1. A method for providing privacy, the method being performed by a user equipment, UE (402) and comprising: receiving a cipher protected Radio Resource Control, RRC, message comprising time sensitive information, TSI; and using a security key obtaining the TSI from the cipher protected RRC message; and providing the obtained TSI to a node of a time sensitive network, TSN.

E1. A method for providing privacy for non-public networks (NPNs), the method being performed by a core network node (406) and comprising: receiving a request message (e.g. Registration Request) transmitted by a user equipment, UE, (402); transmitting a response message (e.g., Registration Response) as a response to the request message, wherein the response message comprises a de-concealing parameter for use by the user equipment in de-concealing concealed time synchronization information, TSI, included in a system information block (SIB) broadcast by a network node.

E2. The method of embodiment E1, further comprising the core network node generating the response message prior to transmitting the response message, wherein generating the response message comprises: the core network node determining a network with which the UE is associated, wherein the network is identified by a network identifier, ID; using the network ID to obtain the de-concealing parameter; and including the obtained de-concealing parameter in the response message.

E3. The method of embodiment E2, wherein determining a network with which the UE is associated comprises the core network node obtaining subscription information associated with an identifier included in the request message and obtaining the network ID from the subscription information.

F1. A network node apparatus (1300), the apparatus being configured to: obtain a first security parameter (e.g., an encryption key) for use in concealing time synchronization information, TSI, originating from a time sensitive network, TSN, associated with a first network (e.g., a first NPN); receive TSI transmitted by a node (e.g., a node within the TSN); conceal the TSI using the obtained security parameter (e.g., encrypting the TSI using the encryption key), thereby generating concealed TSI; include the concealed TSI in a system information block, SIB; and broadcast the SIB over the air.

G1. A network node apparatus (1300), the apparatus comprising: a security parameter obtaining (1402) module adapted to obtain a first security parameter (e.g., an encryption key) for use in concealing time synchronization information, TSI, originating from a time sensitive network, TSN, associated with a first network (e.g., a first NPN); a receiver module (1404) for receiving TSI transmitted by a node (e.g., a node within the TSN); a concealing module (1406) adapted to conceal the TSI using the obtained security parameter (e.g., encrypting the TSI using the encryption key), thereby generating concealed TSI; a SIB generating module (1408) adapted to include the concealed TSI in a SIB; and a transmit module (1410) adapted to broadcast the SIB over the air.

H1. A network node apparatus (1300), the apparatus being configured to: receive time synchronization information, TSI, originating from a time sensitive network, TSN, associated with a first NPN; determine a set of one or more user equipments, UEs, to which the TSI is addressed; for each UE included in the determined set of UEs, unicast to the UE a cipher protected Radio Resource Control, RRC, message containing the TSI.

I1. A network node apparatus (1300), the apparatus comprising: a receiver module (1502) for receiving time synchronization information, TSI, originating from a time sensitive network, TSN, associated with a first NPN; a determining module (1504) adapted to determine a set of one or more user equipments, UEs, to which the TSI is addressed; a transmit module (1506) adapted to, for each UE included in the determined set of UEs, unicast to the UE a cipher protected Radio Resource Control, RRC, message containing the TSI.

J1. A UE (402), the UE being adapted to: transmit a request message (e.g. Registration Request) to a core network node (e.g., AMF); receive a response message (e.g., Registration Response) transmitted by the core network node as a response to the request message, wherein the response message comprises a first de-concealing parameter for use in de-concealing concealed time synchronization information, TSI; receive first broadcast system information comprising the concealed TSI; and de-conceal the concealed TSI using the first de-concealing parameter.

K1. A UE (402), the UE comprising: a transmit module (1602) adapted to transmit a request message (e.g. Registration Request) to a core network node (e.g., AMF); a receiver module (1604) for receiving a response message (e.g., Registration Response) transmitted by the core network node as a response to the request message, wherein the response message comprises a first de-concealing parameter for use in de-concealing concealed time synchronization information, TSI; a broadcast receiver module (1606) for receiving first broadcast system information comprising the concealed TSI; and a de-concealing module (1608) adapted to de-conceal the concealed TSI using the first de-concealing parameter.

L1. A UE (402), the UE being adapted to: receive a cipher protected Radio Resource Control, RRC, message comprising time sensitive information, TSI; and use a security key obtaining the TSI from the cipher protected RRC message; and provide the obtained TSI to a node of a time sensitive network, TSN.

M1. A UE (402), the UE comprising: a receiver module (1702) for receiving a cipher protected Radio Resource Control, RRC, message comprising time sensitive information, TSI; and a de-ciphering module (1704) adapted to use a security key obtaining the TSI from the cipher protected RRC message; and a providing module (1706) adapted to provide the obtained TSI to a node of a time sensitive network, TSN.

N1. A core network node apparatus (1100), the apparatus being adapted to: receive a request message (e.g. Registration Request) transmitted by a user equipment, UE, (402); transmit a response message (e.g., Registration Response) as a response to the request message, wherein the response message comprises a de-concealing parameter for use by the user equipment in de-concealing concealed time synchronization information, TSI, included in a system information block (SIB) broadcast by a network node.

O1. A core network node apparatus (1100), the apparatus comprising: a receiver module (1802) for receiving a request message (e.g. Registration Request) transmitted by a user equipment, UE, (402); and a transmit module (1804) for transmitting a response message (e.g., Registration Response) as a response to the request message, wherein the response message comprises a de-concealing parameter for use by the user equipment in de-concealing concealed time synchronization information, TSI, included in a system information block (SIB) broadcast by a network node.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing privacy, the method being performed by a network node and comprising:

receiving time synchronization information (TSI);

determining a set of one or more user equipments (UEs) that are entitled to receive the TSI; and for each UE included in the determined set of UEs, unicasting to the UE an encrypted version of the TSI, wherein:

the TSI is encrypted using an obtained encryption key, the encryption key is identified by a key identifier that is present in the network node, and the encryption key is specific to a non-public network (NPN), the NPN being identified by an NPN identifier.

2. The method of claim 1, wherein the set of UEs comprises a first UE and the method further comprises, prior to unicasting to the first UE the encrypted version of the TSI, the network node commands the first UE to activate access stratum (AS) security.

3. The method of claim 2, wherein the network node commands the first UE to activate the AS security as a direct result of receiving the TSI.

4. The method of claim 1, wherein unicasting to the UE the encrypted version of the TSI comprises: generating a Radio Resource Control (RRC) message containing the TSI; encrypting the RRC message; and transmitting to the UE the encrypted RRC message.

5. The method of claim 1, wherein the TSI originated from a time sensitive network (TSN) associated with the NPN.

* * * * *